US010255262B2

(12) United States Patent
Hirzel et al.

(10) Patent No.: US 10,255,262 B2
(45) Date of Patent: Apr. 9, 2019

(54) ENCODING A SPREADSHEET PROGRAM FOR STREAM PROCESSING

(71) Applicant: International Business Machines Corporation, Armonk, NY (US)

(72) Inventors: Martin J. Hirzel, Ossining, NY (US); Rodric Rabbah, Yonkers, NY (US); Philippe Suter, New York, NY (US); Olivier Tardieu, White Plains, NY (US); Mandana Vaziri, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/018,680

(22) Filed: Feb. 8, 2016

(65) Prior Publication Data

US 2017/0228358 A1 Aug. 10, 2017

(51) Int. Cl.
*G06F 3/00* (2006.01)
*G06F 17/24* (2006.01)
*H04L 29/06* (2006.01)

(52) U.S. Cl.
CPC ............ *G06F 17/246* (2013.01); *H04L 65/60* (2013.01)

(58) Field of Classification Search
CPC ............................... G06F 17/246; H04L 65/60
See application file for complete search history.

(56) References Cited

U.S. PATENT DOCUMENTS

| | | | |
|---|---|---|---|
| 6,766,512 B1 | 7/2004 | Khosrowshahi et al. | |
| 8,069,190 B2 | 11/2011 | McColl et al. | |
| 8,082,489 B2 | 12/2011 | Jiang | |
| 8,499,290 B2 | 7/2013 | Messerly et al. | |
| 8,788,928 B2 * | 7/2014 | McColl | G06F 17/246 715/219 |
| 2001/0056440 A1 * | 12/2001 | Abramson | G06F 17/246 715/219 |
| 2008/0016436 A1 * | 1/2008 | Liu | H04L 67/34 715/212 |

(Continued)

OTHER PUBLICATIONS

Hirzel et al., "IBM Streams Processing Language: Analyzing Big Data in motion," 2013, pp. 7:1-7:11.*

(Continued)

*Primary Examiner* — Kyle R Stork
(74) *Attorney, Agent, or Firm* — Scully, Scott, Murphy & Presser, P.C.; Kurt Goudy, Esq.

(57) ABSTRACT

A method, system and computer readable program product are disclosed for encoding a function in a spreadsheet program to execute stream processing on a computing system. In embodiments of the invention, the method comprises encoding one or more formulas in one or more cells of the spreadsheet program, each of the formulas supporting data windows and stream partitioning; designating a first group of cells of the spreadsheet program as input cells for holding input values for the one or more formulas; and designating a second group of cells of the spreadsheet program as output cells for holding output values of the one or more formulas. In embodiments of the invention, the stream partitioning includes partitioning a defined stream of data into a plurality of data stream partitions, and the one or more formulas are encoded to operate on the plurality of data stream partitions.

19 Claims, 10 Drawing Sheets

SPREADSHEET COMPILATION IN THE CONTEXT OF SPL

(56) References Cited

U.S. PATENT DOCUMENTS

2013/0159832 A1* 6/2013 Ingargiola .............. G06Q 40/00
 715/220
2015/0378979 A1* 12/2015 Hirzel ................... G06F 17/246
 715/220

OTHER PUBLICATIONS

Vaziri, et al., "Stream Processing with a Spreadsheet", ECOOP 2014, Lecture Notes in Computer Science (LNCS), vol. 8586, Proceedings of 28th European Conference, Uppsala, Sweden, Jul. 28-Aug. 1, 2014, pp. 360-384.

* cited by examiner

| | A | B | C | D | E | F | G | H |
|---|---|---|---|---|---|---|---|---|
| 1 | input Trades | | | | | | output | |
| 2 | sym | price | vol | | price*vol | | vwap | |
| 3 | "ACME" | 194.77 | 2,740 | | 533,670 | | 197.77 | |
| 4 | "ACME" | 195.13 | 2,141 | | 417,773 | | =E24/C24 | |
| 5 | "ACME" | 195.56 | 2,539 | | 496,527 | | | |
| 6 | "ACME" | 197.96 | 2,498 | | 494,504 | | bargain? | |
| 7 | "ACME" | 194.99 | 2,639 | | 514,499 | | YES | |
| 8 | "ACME" | 197.04 | 2,758 | | 543,496 | | =IF(B29<G3,"YES","NO") | |
| 9 | "ACME" | 198.64 | 3,296 | | 654,717 | | | |
| 10 | "ACME" | 200.99 | 3,111 | | 625,280 | | | |
| 11 | "ACME" | 200.69 | 2,335 | | 468,611 | | | |
| 12 | "ACME" | 200.99 | 1,042 | | 209,432 | | price | |
| 13 | "ACME" | 198.77 | 744 | | 147,885 | | | |
| 14 | "ACME" | 199.20 | 726 | | 144,619 | | | |
| 15 | "ACME" | 199.07 | 842 | | 167,617 | | | |
| 16 | "ACME" | 198.99 | 718 | | 142,875 | | | |
| 17 | "ACME" | 197.70 | 773 | | 152,822 | | | |
| 18 | "ACME" | 198.84 | 496 | | 98,625 | | | |
| 19 | "ACME" | 198.16 | 424 | | 84,020 | | | |
| 20 | "ACME" | 199.15 | 737 | | 146,774 | | | |
| 21 | "ACME" | 198.71 | 664 | | 131,943 | | | |
| 22 | "ACME" | 196.73 | 736 | | 144,793 | | | |
| 23 | | | sum | | sum | | | |
| 24 | | | 31,959 | | 6,320,423 | | | |
| 25 | | | =SUM(C3:C22) | | =SUM(G3:G22) | | | |
| 26 | | | | | | | | |
| 27 | input Quotes | | | | | | | |
| 28 | sym | price | | | | | | |
| 29 | "ACME" | 196.96 | | | | | | |

SIMPLIFIED BARGAIN CALCULATOR

FIG. 1

|   | A | B | C | D | E | F | G | H |
|---|---|---|---|---|---|---|---|---|
| 1 | input Trades | | | | | | | |
| 2 | sym | price | vol | | price*vol | vol window | price*vol window | |
| 3 | "ACME" | 166.78 | 2,740 | | 456,977 | ... | ... | |
| 4 | | | | | =B3*C3 | | =WINDOW(E3,5mns) | |
| 5 | | | | | | | | |
| 6 | | | | | | | | |
| 7 | | | | | | | | |
| 8 | input Quotes | | | | | | | |
| 9 | sym | price | | | | vwap | | |
| 10 | "ACME" | 165.88 | | | | 167.87 | | |
| 11 | | :PARTITION( | | | | | =SUM(G3)/SUM(F3) | |
| 12 | | Quotes.sym, "ACME" | | | | | | |
| 13 | | Quotes.proce, Quotes.ts) | | | | bargain? | | |
| 14 | | | | | | YES | | |
| 15 | | | | | | | =IF(B10<F10,"YES","NO") | |
| 16 | | | | | | | | |

BARGAIN CALCULATOR WITH TIME-BASED WINDOWS AND PARTITIONING

FIG. 2

$$f ::= s \mid op(c_1, ..., c_n) \mid \mathbf{latch}(c_0, c_1) \mid \mathbf{select}(c_0, c_1, \ell_0) \mid \mathbf{partition}(c_0, c_1) \mid \mathbf{window}(c_0, \ell_0)$$

$$\mathcal{T}_\ell(c,t) = \begin{cases} \mathrm{dom}(s) \cap [0,t] & \text{if } c \equiv s \\ \{t \in \bigcup_{i=1}^n \mathcal{T}_\ell(c_i, t) \mid \forall i \in \{1,...,n\} : \mathcal{T}_\ell(c_i, t) \neq \emptyset\} & \text{if } c \equiv op(c_1, ..., c_n) \\ \mathcal{T}_\ell(c_1, t) & \text{if } c \equiv \mathbf{latch}(c_0, c_1) \\ \{t_0 \in \mathcal{T}_\ell(c_1, t) \mid \mathcal{E}_\ell(c_1, t_0) = \ell_0, \mathcal{T}_\ell(c_0, t_0) \neq \emptyset\} & \text{if } c \equiv \mathbf{select}(c_0, c_1, \ell_0) \\ \{t_0 \in \mathcal{T}_\ell(c_1, t) \mid \mathcal{E}_\ell(c_1, t_0) = \ell, \mathcal{T}_\ell(c_0, t_0) \neq \emptyset\} & \text{if } c \equiv \mathbf{partition}(c_0, c_1) \\ \mathcal{T}_\ell(c_0, t) & \text{if } c \equiv \mathbf{window}(c_0, \ell_0) \end{cases}$$

$$\mathrm{deps}(c) = \begin{cases} \emptyset & \\ \{c_1, ..., c_n\} & \\ \{c_1\} & \\ \{c_0, c_1\} & \\ \{c_0, c_1\} & \\ \{c_0\} & \end{cases}$$

$$\mathcal{E}_\ell(c,t) = \begin{cases} s(t_1) & \text{if } c \equiv s \text{ and } \mathcal{T}_\ell(c,t) \neq \emptyset \text{ and } t_1 = \max(\mathcal{T}_\ell(c,t)) \\ op(\mathcal{E}_\ell(c_1, t), ..., \mathcal{E}_\ell(c_n, t)) & \text{if } c \equiv op(c_1, ..., c_n) \text{ and } \forall i : \mathcal{T}_\ell(c_i, t) \neq \emptyset \\ \mathcal{E}_\ell(c_0, \mathrm{prev}(\mathcal{T}_\ell(c_1, t))) & \text{if } c \equiv \mathbf{latch}(c_0, c_1) \text{ and } |\mathcal{T}_\ell(c_1, t)| \geq 2 \text{ and } \mathcal{T}_\ell(c_0, \mathrm{prev}(\mathcal{T}_\ell(c_1, t))) \neq \emptyset \\ \mathcal{E}_\ell(c_1, t) & \text{if } c \equiv \mathbf{latch}(c_0, c_1) \text{ and } |\mathcal{T}_\ell(c_1, t)| \geq 2 \text{ and } \mathcal{T}_\ell(c_0, \mathrm{prev}(\mathcal{T}_\ell(c_1, t))) = \emptyset \\ \mathcal{E}_\ell(c_1, t) & \text{if } c \equiv \mathbf{latch}(c_0, c_1) \text{ and } |\mathcal{T}_\ell(c_1, t)| = 1 \\ \mathcal{E}_\ell(c_0, t_1) & \text{if } c \equiv \mathbf{select}(c_0, c_1, \ell_0) \text{ and } \mathcal{T}_\ell(c, t) \neq \emptyset \text{ and } t_1 = \max(\mathcal{T}_\ell(c, t)) \\ \mathcal{E}_\ell(c_0, t_1) & \text{if } c \equiv \mathbf{partition}(c_0, c_1) \text{ and } \mathcal{T}_\ell(c, t) \neq \emptyset \text{ and } t_1 = \max(\mathcal{T}_\ell(c, t)) \\ \{\mathcal{E}_\ell(c_1, t_0)^{t_0} \mid t_0 \in \mathcal{T}_\ell(c, t) \cap (t_1 - \ell_0, t_1]\} & \text{if } c \equiv \mathbf{window}(c_0, \ell_0) \text{ and } \mathcal{T}_\ell(c, t) \neq \emptyset \text{ and } t_1 = \max(\mathcal{T}_\ell(c, t)) \end{cases}$$

FORMAL SEMANTICS

FIG. 3

```
1   stream<Bargain> Bargains = SpreadSheet(Trades; Quotes) {
2     param
3       spreadsheet      : "vwap.xls";
4       inputs           : { A3=Trades.ticker, B3=Trades.price,
5                            C3=Trades.volume,
6                            A10=Quotes.ticker,B10=Quotes.price };
7       partitionByLHS   : Trades.ticker;
8       partitionByRHS   : Quotes.ticker;
9       timeByLHS        : Trades.ts;
10      timeByRHS        : Quotes.ts;
11    output
12      Bargains         : ticker=RString("A3"),
13                         vwap=Float64("F10"),
14                         bargain=Float64("F14"),
15  }
```

CONFIGURING THE SPREADSHEET OPERATOR FROM SPL

FIG. 4

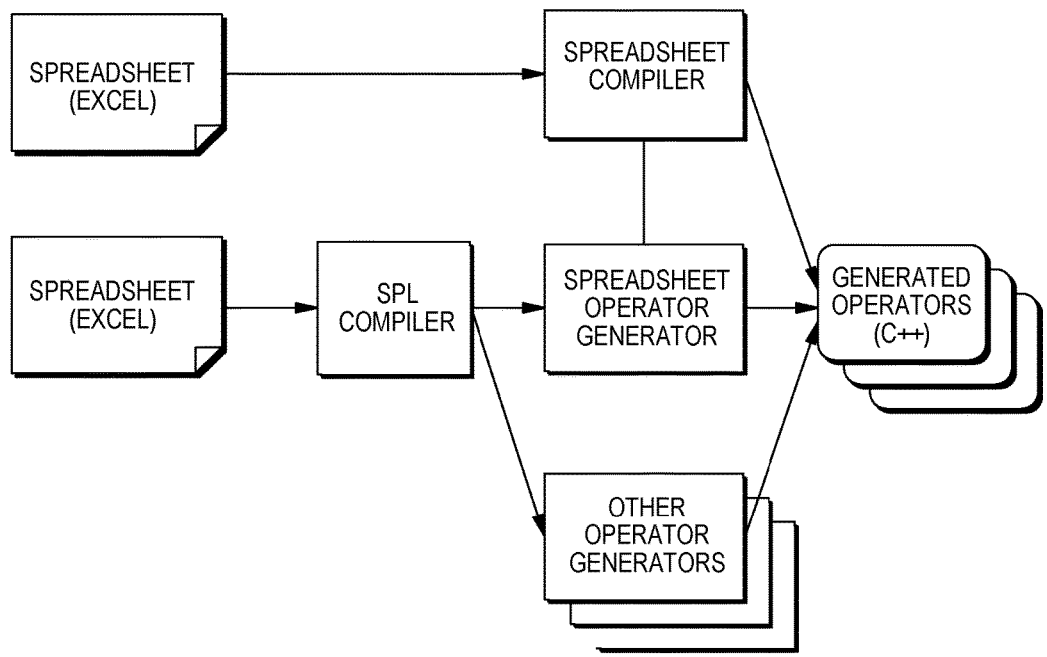

SPREADSHEET COMPILATION IN THE CONTEXT OF SPL

FIG. 5

STREAM GRAPH WITH SPREADSHEET OPERATOR

STREAM GRAPH WITH PARALLEL SPREADSHEET OPERATOR

MANDELBROT THROUGHPUT AT SCALE. THE X-AXIS REPRESENTS THE NUMBER OF CORES AND THE Y-AXIS THE THROUGHPUT IN Ktps

ENCODING A SPREADSHEET PROGRAM FOR STREAM PROCESSING

CROSS-REFERENCE TO RELATED APPLICATION

This application is related to application Ser. No. 15/018,671, for "Spreadsheet Compiler For Stream Processing", filed herewith, the entire contents and disclosure of which are hereby incorporated herein by reference.

BACKGROUND

This invention generally relates to spreadsheet programs, and more specifically, to spreadsheet programs for stream processing. Embodiments of the invention enable a spreadsheet to use stream partitioning and time- or count-based windows for stream computing.

Continuous data streams arise in many different domains: finance, health care, telecommunications, and transportation, among others. Stream processing is a programming paradigm that allows the analysis and aggregation of these data streams as they are being produced. This is very useful since these data streams represent such a high volume of data that it is prohibitively expensive to persist on disk.

In organizations that require stream processing, domain experts may have limited programming experience to directly implement their desired solutions. As a result, the domain experts rely on developers for the actual implementation.

Spreadsheets are familiar end-user programming tools. Spreadsheets can be used for programming streaming computations that consume continuous input streams and produce continuous output streams of data.

Partitions and time windows are two-well known stream processing abstractions but they are not suitable for a spreadsheet-based programming because it is not obvious how to represent a variable or dynamically changing number of partitions (e.g., columns) or a varying window size (e.g., rows) in a spreadsheet which is usually used for editing a fixed number of columns and rows. The variability and dynamism of the abstractions can make working with a spreadsheet intractable as columns and rows that are populated change rapidly with real time data making it difficult for a person to do meaningful computation in the spreadsheet.

SUMMARY

Embodiments of the invention provide a method, system and computer readable program product for encoding a function in a spreadsheet program to execute stream processing on a computing system. In embodiments of the invention, the method comprises encoding one or more formulas in one or more cells of the spreadsheet program, each of the formulas supporting data windows and stream partitioning; designating a first group of cells of the spreadsheet program as input cells for holding input values for said one or more formulas; and designating a second group of cells of the spreadsheet program as output cells for holding output values of said one or more formulas.

In embodiments of the invention, the encoding one or more formulas in the spreadsheet program includes encoding the one or more formulas to operate on the input values in the input cells.

In embodiments of the invention, the one or more formulas operate on the input values to generate the output values, and the encoding the one or more formulas includes encoding the one or more formulas to store the output values generated by the one or more formulas in the output cells.

In embodiments of the invention, the stream partitioning includes partitioning a defined stream of data into a plurality of data stream partitions, and the encoding the one or more formulas includes encoding the one or more formulas in the spreadsheet program to operate on the plurality of data stream partitions in series.

In embodiments of the invention, the encoding the one or more formulas includes encoding the one or more formulas in the spreadsheet program to operate on the plurality of data streams in parallel.

In embodiments of the invention, the one or more formulas includes a first formula and a second formula; the plurality of data stream partitions include a first data stream partition and a second data stream partition; and the encoding one or more formulas includes encoding the first formula in the spreadsheet program to process the first data stream partition, and encoding the second formula in the spreadsheet program to process the second data stream partition.

In embodiments of the invention, the windows are time based windows and collect values in the data stream from specified time intervals moving over time.

In embodiments of the invention, the windows are count based windows and collect a specified number of values in a defined data stream.

In embodiments of the invention, the windows have variable sizes; the stream processing includes processing a defined stream of data values; each of the data values has an associated time value; and the data values are processed by the one or more formulas in an order specified by the associated time values.

In embodiments of the invention, the encoding one or more formulas in one or more cells of the spreadsheet program includes encoding a plurality of formulas in the spreadsheet program to encode a plurality of functions in the spreadsheet program.

Embodiments of the invention provide ways to overcome the finite nature of the spreadsheet. The language for encoding spreadsheets is augmented with support for time based windows by treating windows as first-class operators and decoupling them from the existing graphical representation. An individual cell can now represent either a very large count-based window (e.g., millions of rows of data), or a time-based one that is variable in size and specified using the passage of time. Embodiments of the invention also provide a construct for specifying partitioning, that is, performing the same computation for different keys of a possibly large or unknown data set. The user specifies the partitioning criterion and the spreadsheet client only displays the computation for select keys.

These features result in an easy-to-use programming model with rich expressivity. However, they pose challenges on the performance of the implementation, because the computation per incoming stream data item is no longer bounded by the number of cells in the spreadsheet. To overcome these challenges, embodiments of the invention compile the spreadsheet into C++ and deploy it using a Stream Processing Language (SPL) [M. Hirzel, H. Andrade, B. Gedik, G. Jacques-Silva, R. Khandekar, V. Kumar, M. Mendell, H. Nasgaard, S. Schneider, R. Soulé, and K.-L. Wu. IBM Streams Processing Language: Analyzing big data in motion. IBM Journal of Research & Development, 57(3/4):7:1-7:11, 2013.]. An efficient implementation is provided for windows based on incremental computation, and for partitioning using inherent data-parallelism.

Embodiments of the invention provide an extension of spreadsheets to support stream processing for applications that require time-based windows and partitioning, formal semantics for the language extension, and an implementation of a spreadsheet compiler for the new language features with optimizations that incrementalize computation over windows and parallelize partitions.

Embodiments of the invention provide a spreadsheet-based programming model for stream processing that is expressive, yet easy to use for non-programmers, with an implementation that matches modern stream processing languages.

BRIEF DESCRIPTION OF THE DRAWINGS

FIG. 1 illustrates a simplified bargain calculator.

FIG. 2 shows a calculator with time-based windows and partitioning in accordance with an embodiment of the invention.

FIG. 3 shows formal semantics that may be used in embodiments of the invention.

FIG. 4 illustrates a procedure for configuring the spreadsheet operator from SPL.

FIG. 5 illustrates spreadsheet compilation in the context of SPL.

DETAILED DESCRIPTION

Figure 2A:
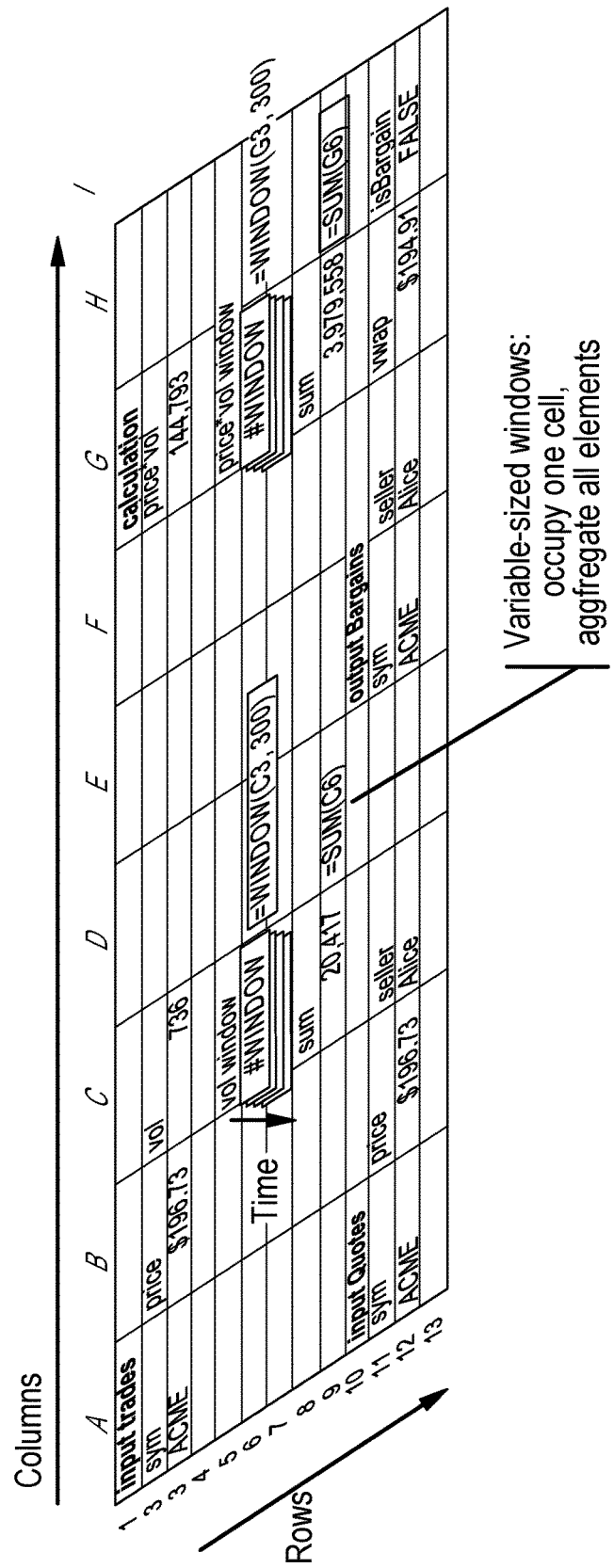
FIG. 2A shows variable-sized windows that may be used in the calculator of FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention provide a method, system and computer program product for compiling spreadsheets for scalable stream processing. Embodiments of the invention may be implemented as a service running remotely on a server accessed over a network, and may be realized as a cloud based offering. In embodiments, an input data stream is partitioned into a plurality of data stream partitions, each of the stream partitions including a plurality of windows holding one or more values. Each of a plurality of spreadsheets receives one of the data stream partitions, and the spreadsheets are compiled with formulas for stream computing to parallelize computations over said stream partitions.

Embodiments of the invention may be used with data streams in many different domains such as finance, health care, telecommunications, and transportation, among others.

The following discussion gives an overview of an embodiment of the invention using a streaming bargain calculator as a running example. The calculator consumes two input streams: Trades and Quotes. Trades contain transactions that have been made, and Quotes contain quoted stock prices. A stream is a series of tuples comprised of named attributes. For each quoted price, the objective is to determine whether or not that price is a bargain, by comparing the price to an average obtained using recent trades. The average considered is the volume-weighted average price (VWAP). Given a window of prices Pi and volumes Vi, the VWAP is defined as:

$$VWAP = \frac{\sum_i P_i \times V_i}{\sum_i V_i}$$

After computing the VWAP over Trades, the bargain calculator determines whether or not each price in Quotes is less than the VWAP. If yes, the calculator outputs a bargain. This computation is done for each stock symbol that appears in the Quotes stream, and averages are taken over 5 minute windows. FIG. 1 illustrates a simplified version of this application, where the bargain calculation was done for a single stock symbol, with averages taken over small finite windows.

In this example, the available input streams from the server are Trades and Quotes. In FIG. 1, the window A3 through C22 contains live input tuples from Trades, and they are comprised of a stock symbol, a price, and a volume. When the user first subscribes to a stream (via a control button), the tuples start scrolling from bottom to top in a designated window and they continue scrolling as more data becomes available.

The user can visualize aspects of data (e.g., price chart in FIG. 1), and all visualizations are live. The user can also compute and transform data as needed. Cell C24 in FIG. 1 contains the aggregation of volumes over the given window (C3 through C22). Column E contains calculations of price multiplied by volume and cell E24 is their aggregation. The VWAP is computed in cell G3 as E24 divided by C24. Finally, cell G7 compares the latest quoted price (B29) to the VWAP, in order to determine whether or not that quoted price is a bargain.

FIG. 1 simplifies the bargain calculator application in two important ways. First, aggregations can only happen over graphical windows in the spreadsheet, so the programming model is not sufficiently expressive to support windows defined as "5 minutes worth of data". Time-based windows can be very large, variable in size, and may require an unbounded space on the spreadsheet. Second, FIG. 1 is only computing bargains for one symbol. If Trades contains many different symbols, the user would have to select each, and perform similar bargain calculations, requiring a potentially unbounded space on the spreadsheet.

Embodiments of the invention overcome the finite nature of the spreadsheet. Embodiments of the invention augment the language with support for time-based windows by treating these windows as first-class operators and decoupling them from the existing graphical representation. Embodiments of the invention also extend the language with a partition construct that allows specifying computations for all keys of a partition.

FIG. 2 shows the running example in the augmented language. In this Figure, the Trades and Quotes streams are partitioned using the symbol as the partitioning key. The user specifies the bargain calculation for a sample key ("ACME"), and the computation is performed for all keys. Cells A3 through C3 contain tuples from the Trades input with "ACME" as key. The PARTITION operator in cell C3 has four parameters. The first indicates the partitioning key. The second is the sample key ("ACME") and indicates what to display in the spreadsheet. The third is the value that should appear in cell C3, which in this case is the volume corresponding to each tuple (Trades.vol). Finally, the last parameter of the PARTITION operator indicates which attributes in Trades contain timestamps. This information is needed when computing with time-based windows over these values. Timestamps are used to determine what values belong to a window at any given moment in time. Any input stream into the spreadsheet that is used directly or indirectly in a time-based window must indicate which of its attributes constitutes its timestamp, even if the stream is not partitioned.

In FIG. 2, the aggregations of volume and price×volume are computed using time-based windows. The formula WINDOW(E3,5 mns) in cell G3 means that this cell represents a window of past values that have appeared in E3. It contains those whose timestamps are within 5 minutes of the last time that the value of E3 changed. This new construct preserves a reactive nature: when a new value comes into E3, then windows on that cell are updated. These windows are not spontaneously updated in realtime.

The bargain calculator shown in FIG. 2 is more succinct than what appears in FIG. 1, yet it is more powerful. The bargain calculator of FIG. 2 is also much simpler to write than a stream processing program, so a business user with little programming experience could write it. To overcome the challenges posed on performance by these new features, spreadsheets may be compiled to C++ and deployed using SPL. The calculator of FIG. 2 provides an efficient incremental implementation for time-based windows, and supports partitioning using data parallelism.

Figure 2B:
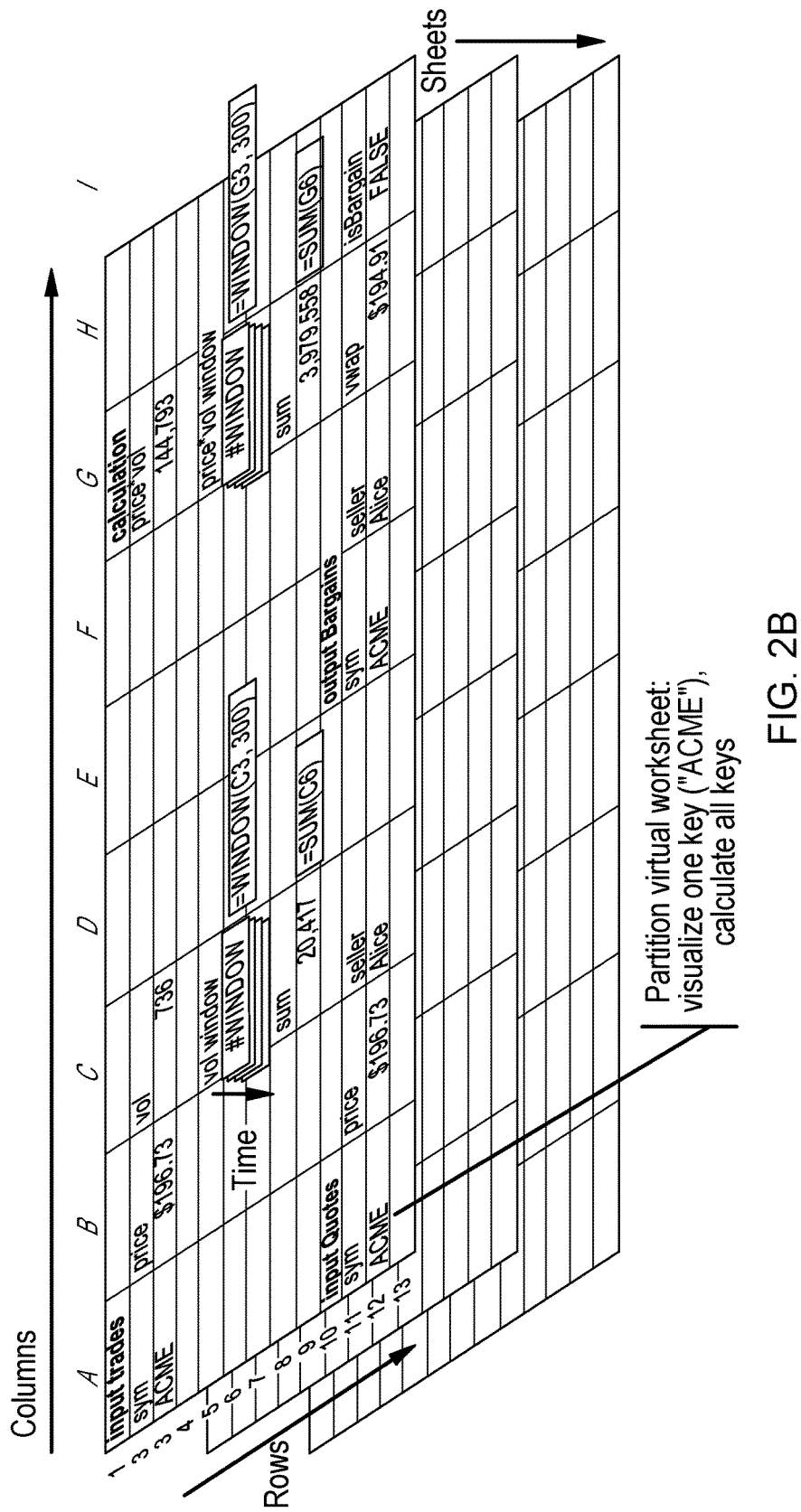
FIG. 2B depicts a partitioned virtual worksheet that may be used in the calculator of FIG. 2.

FIG. 2A shows variable-size windows that may be used with the calculator of FIG. 2. FIG. 2B illustrates partitioned virtual worksheets that may be used with the calculator of FIG. 2.

Formal Semantics

The following discussion formalizes the programming model of embodiments of this invention. A client—a collection of cells and formulas—is connected to a server providing live data streams. The semantics specify when and how cell values are computed.

This formalization starts from a core language [see for example, M. Vaziri, O. Tardieu, R. Rabbah, P. Suter, and M. Hirzel. Stream processing with a spreadsheet. In European Conference on Object-Oriented Programming (ECOOP), pages 360-384, 2014] and adds window and partition constructs. The window construct collects values from a time interval, e.g., the last five time units of a given stream. The partition construct partitions a stream into multiple substreams, e.g., stock prices according to stock symbols.

To support time-based windows, numerical timestamps are attached to streaming data. Partitioned streams are handled by defining a collection of spreadsheets for each client. Each spreadsheet listens to the same server streams and computes the same formulas as the others, but each spreadsheet picks from partitioned streams only those data items that correspond to the key the spreadsheet is responsible for. By design, although a client may contain multiple occurrences of the partition construct, all these occurrences share the same global key. While this prevents users from partitioning data streams across multiple dimensions, this matches the expressive power intended for the tool.

Ticks and Timestamp

Let a tick T be a possibly empty, possibly infinite set of natural numbers $\{t_1, t_2, \ldots\}$ encoding timestamps for some unit of time, e.g., microseconds since midnight. A non-empty finite tick T always admits a maximal element max(T). Given a finite tick T with at least two elements, we define the second-to-max element prev(T).

Values and Windows

Let a value v be either a literal l or a window—a finite, possibly empty set of literals with pairwise distinct timestamps. Windows may be nested.

$$v::=l \mid \{l_1^{t_1}, \ldots, l_n^{t_n}\}$$

Streams and Servers

Let a stream s be a map from a tick to values. We write dom(s) for the tick of s and s(t) for the value of s at time $t \in dom(s)$. We say that s ticks at time t iff $t \in dom(s)$. Let a server S be a finite collection of streams. We define the server tick N of S as the tick $\cup_{s \in S} dom(s)$.

In contrast to the concrete programming language in the tool, timestamps are an implicit, intrinsic part of all streams. Streams of tuples can be encoded as multiple streams—one per component of the tuple—with the same tick.

Clients, Cells, and Formulas.

Let a client C be a finite collection of cells. Each cell has a unique name c and contains a formula f. We write c≡f iff c contains formula f.

The syntax and semantics of formulas are defined in FIG. 3 where s denotes a server stream and op denotes a family of operators on values (such as division /, greater-than >, or Excel's IF or SUM functions). For simplicity, nesting constructs are not permitted and constant formulas are modeled implicitly by means of constant server streams. Moreover, it is assumed that operators are total functions defined for all argument values and do not distinguish operators on scalars are not distinguished from operators on windows.

Intuitively, the formula f of a cell c defines a stream of computed values with name c. Because of partitions however, not just one but a collection of computed streams—one stream per partitioning key—are specified. FIG. 3 specifies the tick of c up to time t—Tl(c,t) and the value of c at time t—εl(c,t)—for key l.

The value of c is undefined if no case in FIG. 3 applies, as for instance before the first tick of c. The value of c is not only defined when c ticks but also in-between. By design, the value remains constant between ticks.

Synchronous Hypothesis and Physical Time.

The semantics unify the logical and physical times. Stream values are processed in the total order specified by the timestamps. The formalism presented herein does not express transmission or processing delays, hence is incapable of reasoning out of order.

Formally, the semantics presented herein are built upon the entire histories of the server streams. Of course, an implementation will stream the values from the server streams over time—real execution time. The model therefore requires these values to be streamed in order within and across streams and, in exchange, guarantees that the computed values for the client cells will be produced in order.

Physical time is not real time. First, computed values are obtained instantly, e.g., the tick of cell c with formula add(s, s) is equal to the tick of the server feed s. Second, the timestamps on server streams may be obtained by sampling a real-time clock, but they may also come from other non-real-time sources, such as historical data.

Operators.

An operator ticks when any operand does, once all of the operands are defined. The operands compute using the most recent values of the operands.

Latches and Well-Formedness.

The latch construct makes it possible to retain values—latch($c_0$; $c_1$) ticks when $c_1$ does returning the value of $c_0$ at the previous tick of $c_1$. State machines can be constructed using latches in cycle of cells, for instance to derive the value of a cell from the previous value of the same cell.

Cycles are permitted only when broken by latches. Formally, let deps(c) be the immediate dependencies of cell c defined in FIG. 3. deps(c) captures the set of cells that occur in the formula except for the first argument of latch. A client C is said to be well-formed iff the directed graph with vertices $c_0 \in C$ and edges ($c_0$; $c_1$) for all $c_1 \in deps(c_0)$ is acyclic. The semantics of clients are defined by recursion—the tick and values of a cell are derived from the tick and values of the cells occurring in its formula. Well-formedness ensures that this recursion is well-founded.

Filtering and Partitioning.

The select construct filters a stream according to a condition—select($c_0$; $c_1$; $l_0$) ticks when $c_1$ does and evaluates to $l_0$ returning the most recent value of $c_0$.

The partition construct mimics the select construct except that the key l is global instead of specified with each occurrence of the construct. The partition construct effectively routes the values in the stream $c_0$ to the instance of the spreadsheet specified by the stream $c_1$.

Suppose $c_0 \equiv s_0$ and $c_1 \equiv s_1$, where $s_0$ and $s_1$ are two server streams with the same tick, $s_1$ is a stock symbol, and $s_0$ is the price of the stock. Formula select($c_0$, $c_1$, "ACME") computes the stream of prices for "ACME" irrespective of the global key l. In contrast, formula partition($c_0$, $c_1$) computes the stream of prices of stock l in spreadsheet l, hence partitions the stream of prices across the collection of spreadsheets.

Windowing.

The window construct collects the most recent values of a stream—window($c_0$, $l_0$) ticks when $c_0$ does and captures the values of c0 in the last $l_0$ time units with their respective timestamps. For brevity, count-based windows are not modeled.

Because the duration of a window is constant, windows can be maintained incrementally by appending new values and evicting old values. A window can only include at time t a value from an earlier time $t_0 < t$ if it included this value continuously since time $t_0$.

With this specification, the window is only updated when $c_0$ ticks, therefore old values are only evicted when $c_0$ ticks. As a result, while a window will never contain more than $l_0$ time units worth of data, this data might be outdated when used in combination with faster-paced streams.

Alternatively, $t_1$ could be specified as $t_1 = \max(N \cap [0, t])$ in the last case of FIG. 3 so that eviction takes place on each server tick or even that $t_1 = t$, which would evict right on time. The latter option requires "spontaneous" computation, that is to say, computation triggered in the absence of server ticks. Eviction is not forced on all server ticks as it is possible to achieve this programmatically if needed.

These semantics are deterministic, reactive, and can be computed incrementally over time.

Determinism.

The ticks and values up to time t for key l of the cells in a well-formed client C are defined via a well-founded recursion from the ticks and values of the server streams S up to time t. As a result, if all the operators "op" are deterministic then the semantics are deterministic.

Reactivity.

The tick of a cell is a subset of the server tick and the value of a cell remains constant between ticks. In other words, changes in the client happen only in reaction to server ticks.

Incrementality.

The semantics can be computed incrementally over time. Let ($t_0$, $t_1$) be two consecutive server ticks. The ticks and values of the cells in a client C at time $t_1$ can be computed from the ticks and values of the cells at time $t_0$ plus the tick and values of the server streams at time $t_1$ plus the values stored by the latches.

The space and time complexity of this incremental computation however can be large. First it depends on the number of stream data items in windows, which, in general, is not statically known or bounded. Second it depends on the cost of operators, especially the cost of operations on windows such as computing aggregates. Finally it depends on the number of partitioning keys and the use of partition constructs. These costs and how to mitigate them are discussed below.

Spreadsheet Compilation

Discussed below is a compiler that implements the formal semantics discussed above.

Overview

The user writes a spreadsheet and describes where it fits in a larger stream program, i.e., how it connects to other upstream and downstream operators. To support end-users, a simple harness may be pre-defined or auto-generated to input data into and output data from the spreadsheet. Embodiments of the invention described herein use stream programs written in SPL, but the approach could be adapted to other streaming languages. A stream program describes a directed graph of streams and operators. Each stream is a conceptually infinite ordered sequence of tuples, where a tuple is a record with named attributes. Each operator is a source, a sink, or a stream transformer. The program configures the operators and arranges them in a graph.

FIG. 4 shows an example for how to configure the spreadsheet operator for the stream graph. Line 1 connects the operator to an output stream Bargains and two input streams Trades and Quotes. Line 3 names the file containing the actual spreadsheet from FIG. 2. Lines 4-6 assign attributes of input tuples to spreadsheet cells. Lines 7-8 identify attributes serving as partitioning keys, and Lines 9-10 identify attributes serving as timestamps for time-based windows. Note that keys and timestamps need only be specified when the user wants to take advantage of partitioning and timebased windows, respectively. Finally, Lines 12-14 assign spreadsheet cells to attributes of output tuples. The SPL code in FIG. 4 could be auto-generated from a specification, such as the PARTITION construct discussed above.

The spreadsheet compiler, described below, is independent of SPL. The compiler reads the spreadsheet file, and generates optimized C++ code for the spreadsheet file. FIG. 5 depicts how the spreadsheet compiler is used in the context of SPL. The SPL compiler is extensible with a library of operator generators; in other words, it parses the SPL program and performs some checks, but delegates the compilation of individual operators to the corresponding code generators. Specifically, when the SPL compiler encounters a use of the spreadsheet operator, the compiler invokes the spreadsheet operator generator. The spreadsheet operator generator checks and resolves names and types of parameters and input/output assignments. If there are no errors, the spreadsheet operator generator invokes the spreadsheet compiler. In addition, the spreadsheet operator generator generates surrounding code for calling the cell setters, cell getters, and computing functions produced by the spreadsheet compiler. The resulting code is then linked with the C++ code produced by all the operator generators and with the SPL runtime library to yield binaries that can execute on either a single machine (typically a multi-core) or on a cluster of machines.

Design Considerations

Overall, the spreadsheet compilation is faithful to the formal semantics discussed above. Conventional spreadsheet functions (represented by op in the semantics) are pure and deterministic. Most spreadsheet processors come with rich function libraries, but a small subset accounts for most practical uses. Computed cell references are only supported via Excel's VLOOKUP and MATCH functions, all other references must use explicit cell names.

The supported types are floating point numbers, strings, Booleans, and errors. As is typical in spreadsheet processors, functions are total and handle all types, producing or forwarding error values as needed.

The calculus constructs latch, window, and select are exposed to the spreadsheet programmer as new functions PRE, WINDOW, and SELECT, respectively. A check is made at compile time that results of invocations of WINDOW can only flow into aggregation functions that return a simple scalar, such as SUM, COUNT or AVERAGE. This means windows cannot nest, and can be thought of as enforcing a simple type system on functions. It is additionally required that invocations of SELECT are restricted to output cells, and cannot appear in cells referenced by other formulas. This is because so far, the generated C++ code only performs dynamic dependency tracking at the leaves of the cell reference graph. The generated code does not severely reduce expressivity, as the desired selection condition can be computed in the spreadsheet using the full expression language.

In embodiments of the invention, implementation relies on universal partitioning, where either no input streams are partitioned, or all input streams are partitioned using the same key type. All partitioning must happen at the input to the spreadsheet, formulas in regular cells cannot use the partition construct. Universal partitioning is sufficient but not necessary for partition isolation, where inputs for a key have no observable effect on outputs for a different key. This enables an implementation where partitioning is handled entirely by the operator in the stream graph, and the spreadsheet compiler is oblivious to it.

Timestamps needed by time-based windows are given by attributes of input tuples. All attributes of a single tuple are synchronous with each other. The tick of an output is defined as specified in the formal semantics discussed above. In particular, upon a given input, not all outputs necessarily tick. The ticking outputs are determined by static dependencies (deps from FIG. 3) and dynamic dependencies (uses of SELECT). In embodiments of the invention, implementation submits an output tuple if at least one of the cells feeding its attributes ticks.

In embodiments of the invention, the implementation relies on universal time, where time is strictly monotonically increasing across all input streams. Furthermore, if tuples on multiple input streams have the same timestamp, our implementation treats them as synchronous. Universal time is easy to establish in the common case where there is only a single input stream, but is inherently difficult when there are multiple input streams, such as Trades and Quotes for computing a bargain. This difficulty stems from clock skew in distributed systems: timestamps of tuples from different remote sources cannot be assumed to be based on the same clock.

This problem is well-recognized in the streaming literature, and there are different solutions. One solution is to wait for tuples that are slightly out of order, while dropping and logging tuples that are substantially out of order. There are other cases where the problem is easier to solve; for instance, if input streams lack a sender-assigned timestamp attribute, the receiver can inject timestamps satisfying universal time. External time management is orthogonal to spreadsheet compilation. The experiments described herein simply use test input streams that satisfy universal time by construction. To support different time management solutions, the Spreadsheet operator can be configured to either fire immediately on each tuple, or to only use tuples for setting input cells, but delay firing until punctuations.

Spreadsheet Compiler

In embodiments of the invention, the spreadsheet compiler is implemented as a Java application that consumes a spreadsheet in Microsoft Excel format and generates a C++ class that stores the state of the sheet and can replicate its computation. The compiler also requires as arguments a specification of input and output cells. The input cells are passed as a list of lists, representing the mapping of input streams, each with its own list of attributes, to cells in the spreadsheet.

Architecture.

The compiler front-end leverages the Apache POI library [Apache POI. The apache poi project. http://poi.apache.org. Retrieved November, 2014.] to process Excel spreadsheets in their original, binary, format. After parsing, spreadsheets are internally represented as sets of key-value pairs. The compiler applies a series of standard phases (expression flattening, constant propagation, and dead code elimination), introducing additional synthetic cells when necessary.

After normalization, the compiler computes, for each cell, the subset of input streams for which it ticks. Due to the requirement that SELECT be only used in output cells, this subset can always be determined statically. The computation follows the semantics described above: constants never tick, PRE cells tick when their second argument ticks, and all other cells (including invocations of WINDOW) tick when any of their arguments ticks.

Code Generation.

Using this information, the compiler generates, for each input stream, a function that propagates the computation through all ticking cells. This function operates in two steps: it first updates all cells that contain an invocation of PRE, copying parts of the previous state as appropriate, then computes the new values for all other cells. PRE cells can potentially reference each other in cycles, and updating their values may require additional temporary memory (at most the number of such cells). Other cells, by construction, do not have cyclic dependencies, and the compiler emits code that updates them in-place, following a topological ordering of their dependency graph. For a spreadsheet with p invocations of PRE and n other cells, the generated class will therefore need to store at most $2 \cdot p + n$ values (not counting time-based windows). The actual storage requirements are reduced by an optimization phase that identifies cells occurring in a single propagation function, and promotes them to temporary, locally-allocated, variables.

The generated code is supported by a companion C++ library for manipulating spreadsheet values. Values are represented using a single universal type, encoded as a tagged union. Spreadsheet functions (IF, SUM, etc.) are written in header-only, templated code, such that the output of the spreadsheet compiler can be properly optimized when passed to the C++ compiler. For instance, functions of variable arity such as SUM are implemented using loops, but the loop bounds are always determined statically and passed as template arguments. The language of supported spreadsheet functions is extended simply by writing C++ implementations for the desired functions.

Time-Based Windows.

The implementation of time-based windows in the companion library is separated into two parts; a common class implements the windowing mechanism for values, inserting new values and evicting old ones based on arrival timestamps, and specialized classes implement the logic for each aggregating function. These can be implemented either as a single function accepting an iterator over all values currently in the window, or as callbacks invoked by the generic windowing class at insertion and eviction. For certain aggregating functions (e.g. SUM, AVERAGE, COUNT), the second approach provides constant-time, incremental computations. The running time of other aggregating functions such as MAX could be improved using, e.g., the techniques presented in [A. Arasu and J. Widom. Resource sharing in continuous sliding window aggregates. In Conference on Very Large Data Bases (VLDB), pages 336-347, 2004.].
Public Interface.

Figure 6:
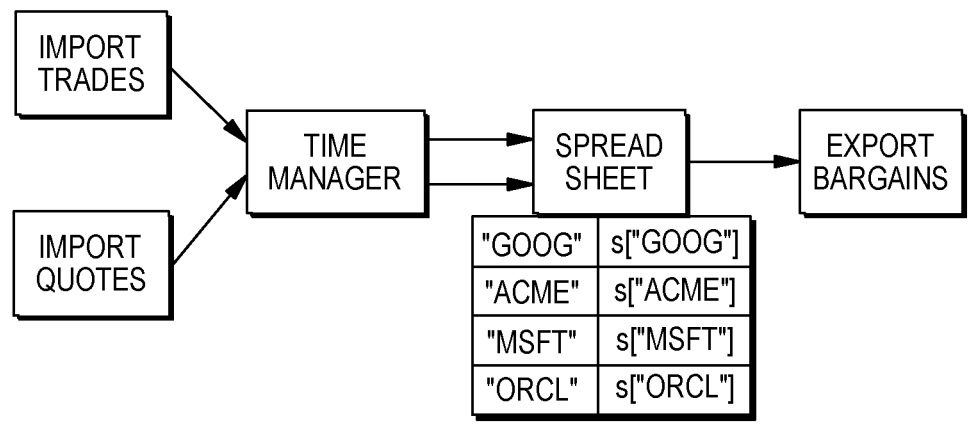
FIG. 6 illustrates a stream graph with spreadsheet operator.

The compiled class exposes public member functions serving three purposes: 1) setters, used to communicate new values to fill input cells, 2) compute, used to trigger the recomputation of the spreadsheet, and 3) getters, used to retrieve the values of output cells. The protocol for a client to process a tuple from a stream is to first invoke the setters corresponding to each attribute, then trigger the computation, and finally to inspect the values of the desired output cells. The getters accept as a parameter a pointer to a Boolean, allowing the compiled spreadsheet to communicate to the client whether the output value has ticked since the last inspection. In the case of a spreadsheet using time-based windows, the timestamp corresponding to the tuple arrival time is passed as an argument to compute.
Runtime Support FIG. 6 shows a Spreadsheet operator generated by the compilation depicted in FIG. 5 in the context of a simple stream graph. The Import and Export operators can be based on TCP; or can use pub-sub when business users create ad-hoc spreadsheets; or can contain local input generators and output validators for testing purposes. The TimeManager establishes universal time as discussed above.

The state of a partitioned spreadsheet operator holds a mapping from keys (e.g. "ACME") to spreadsheet states (e.g. s["ACME"]). A spreadsheet state holds the values of cells that did not tick along with any data required to implement latch and window. When an input tuple arrives, the spreadsheet operator extracts the key, retrieves the spreadsheet state, and calls the appropriate cell setters. Upon a firing (triggered by an input tuple or punctuation), the operator calls compute on the spreadsheet state for the right key, and submits tuples on output streams corresponding to output cells that ticked, if any. In general, the stream graph can of course also contain more operators than shown in FIG. 6, such as operators that parse XML or enrich streams with quasi-static information from a database.

Figure 7:
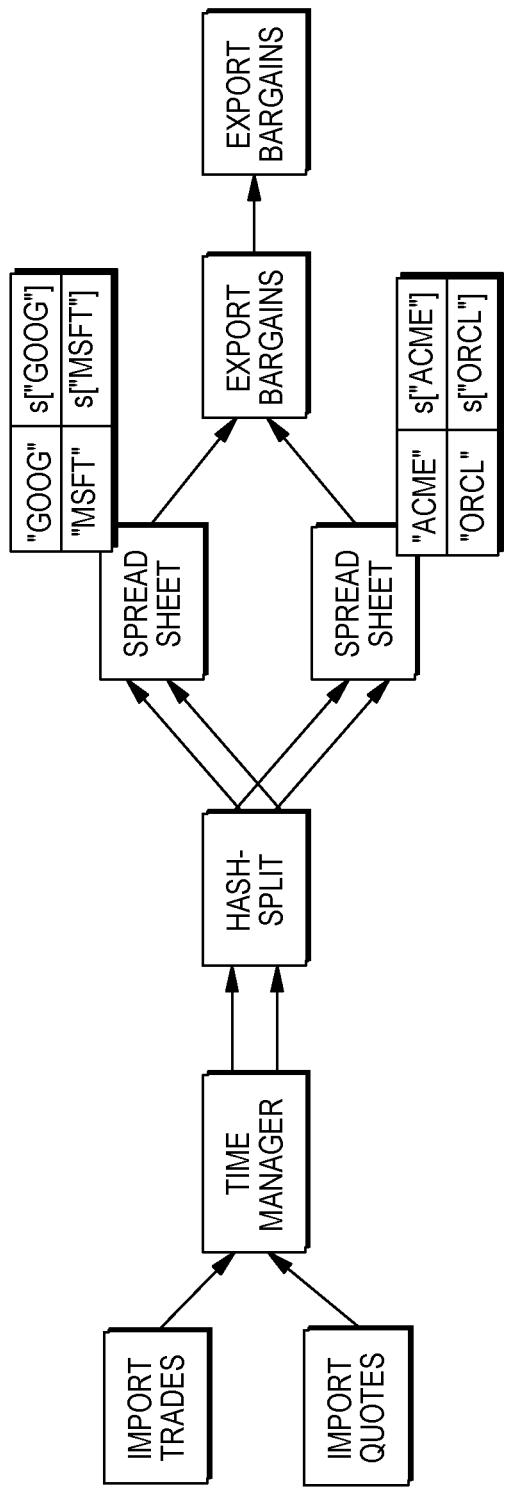
FIG. 7 shows a stream graph with parallel spreadsheet operator.

Partitioning can be exploited for parallelization. FIG. 7 shows a version of FIG. 6 that adds data parallelism by using multiple replicas of the Spreadsheet operator. Each replica along with its sub-streams is referred to as a parallel channel. For illustration purposes, FIG. 6 shows only two channels, but in general, the number of channels is a trade-off between speedup and resource consumption. The HashSplit operator sends each tuple to a channel determined by its key. That guarantees that tuples with the same key always go to the same channel, and thus, the Spreadsheet operator in each channel holds the correct spreadsheet state. Since state is disjoint, no inter-channel communication is required.

Tuples within a single channel are delivered in order, but tuples in different channels may be out-of-order depending on processing and communication speed. Therefore, the stream graph contains an OrderedMerge operator that interleaves tuples from all channels in an order consistent with their timestamp attributes. Note that the sequence of timestamps can have gaps but no duplicates, since the formal semantics enables sampling but not stuttering. The Ordered-Merge maintains one FIFO queue per channel. When the Ordered-Merge receives a tuple, the Order-Merge inserts the tuple to the corresponding queue, and then drains all queues as much as possible. The Ordered-Merge can drain (dequeue and submit) a tuple if the tuple's timestamp is minimal among all tuples at the front of channel queues and there is no empty queue. The latter requirement guarantees that there are no tuples with smaller timestamps in-flight on any channel whose queue is currently empty. To avoid deadlock, the channel queue sizes are dynamic; an alternative solution would be to periodically flush all channels.
Experimental Study Embodiments of the invention were evaluated with a number of benchmarks. For the purpose of evaluation, an SPL benchmarking harness code was written around the spreadsheets following the illustration in FIG. 5. The following discussion describes the use cases and discusses the performance of the spreadsheet operator, then considers how partitioning can impact performance via parallelism, and lastly quantifies the impact of incremental window updates on performance.
Benchmarks The largest of the examples is mandelbrot which computes the RGB pixel value for an image of the Mandelbrot set. It does not contain any windows but presents an opportunity for parallelism by partitioning the image into pixels. Another example is vwap, described above. vwap is motivated by a trading application [A. N. Madhavan. Volume-weighted average price (vwap). In Encyclopedia of Quantitative Finance, 2010.]. This example uses time-based windows and stock-ticker based partitions. The linearroad example is a vehicle toll system for expressways with variable toll rates. An implementation assumes a partitioning by road segments as this was most natural to implement in the spreadsheet.

The remaining examples are pong which calculates a 2D line intersect to play the game Pong, tax which calculates progressive income taxes, forecast which performs linear regression using least-square fit to predict future temperatures, and average which calculates a weighted average.

The test suite is summarized in Table 1.

TABLE 1

Spreadsheet benchmarks

| | cells | exprs | window | partition |
|---|---|---|---|---|
| mandelbrot | 418 | 1,527 | — | pixel |
| vwap | 9 | 14 | 2 × 5 m | ticker |
| linearroad | 20 | 18 | 1 × 30 s & 2 × 5 m | segment |
| pong | 35 | 86 | — | game id |
| tax | 21 | 37 | — | state |
| forecast | 43 | 60 | 2 × 6 | location |
| average | 33 | 27 | 2 × 6 | — |

For each example, the table shows the number of cells needed to encode the computation in the spreadsheet as well as the number of live expression nodes in the abstract syntax tree after dead-code elimination, e.g., a cell containing the equation (A1*A2)+(B1*B2) results in three expression nodes. The formulas are relatively easy to express in cells compared to writing the comparable code in an imperative language, particularly when partitions and windows are used, since these are oneliners in the spreadsheet (e.g., the formula for cell F10 in FIG. 2). The largest of the benchmarks (mandelbrot) requires 400 cells to compute the number of iterations to convergence. But even these are straightforward to write in a spreadsheet, because for example in Excel, one just has to write out the formula once and then drag the formula to replicate it.

Table 1 also reports the number and size of each window that may exist as N×W where N is the number of windows and W is the size of the windows either in time or number of historical values, e.g., 2×5 m represents 2 windows that are 5-minute long, and 2×6 are two windows each containing 6 historical values. The column labeled "partition" records the attribute used for partitioning the input stream and replicating the spreadsheet operator for the sake of exploiting parallelism.

Spreadsheet Throughput

Each spreadsheet was compiled and ran as part of an SPL test harness on a 12-processor machine with 16 GB of RAM running Red Hat Enterprise Linux Server release 6.5. Each processor is a 2.93 GHz Intel Xeon X5570 with 4 cores and 8 hardware threads. The experiments were repeated 5 times and the arithmetic mean throughput is reported throughout. The input sets were created using real traces when available and synthetically generated data otherwise.

The throughput for each spreadsheet operator (SS) is reported in Kilo tuples per second (Ktps). This is calculated by recording the total time spent in the spreadsheet operator including the cost to read and write data from the I/O streams. Every spreadsheet operator processed a total of 1M input tuples. The results are shown in Table 2.

TABLE 2

Throughput results.

|  | SS Ktps | SPL Ktps | SS/SPL |
|---|---|---|---|
| mandelbrot | 16.8 | 3,329.4 | 0.005 |
| vwap | 1,016.0 | 440.2 | 2.308 |
| linearroad | 2,439.5 | 926.7 | 2.632 |
| pong | 710.3 | 3,930.9 | 0.181 |
| tax | 2,737.9 | 4,748.2 | 0.577 |
| forecast | 3,446.3 | 7,812.5 | 0.441 |
| average | 6,211.4 | 8,072.9 | 0.769 |

The spreadsheet is compared throughput to native SPL implementations for each of the benchmarks. These appear in the table under the heading SPL. The last column in the table computes the ratio between the SS and SPL throughputs such that a value less than one indicates the spreadsheet operator is slower and conversely a value greater than one indicates the spreadsheet operator is faster than SPL. In mandelbrot the slowdown is significant because, in part, the spreadsheet version always computes all iterations of the convergence criterion for each pixel whereas, in the imperative SPL model, a straightforward loop achieves the same result while breaking early whenever possible.

In the case of vwap and linearroad, the performance of the spreadsheet operator is 2.3× and 2.6× better than the SPL version. This is because both of these benchmarks require more than one operator in the native implementation (3 for vwap and 6 for linearroad), which in turn incur added inter-operator communication overhead. The GNU C++ compiler cannot entirely eliminate this overhead as the operator definitions are contained in separate files. In contrast, the template based code generation approach adopted, in embodiments of the invention, for the spreadsheet compilation avoids this problem because all the code is generated into a single file.

The pong benchmark in SS is around 5× slower than the SPL version but is in fact fast enough that it is competitive and can win 50% of its games against a Javascript computer player implementing the same heuristic. The remaining benchmarks show that the SS operators are around 2× slower on average than the SPL versions.

Spreadsheet Replication for Parallelism

One of the advantages of deploying the spreadsheet operator in SPL is the ease of parallelization. It is achieved by adding an annotation to the operator @parallel(width=N,
partitionBy=[{port=Inputs,
attributes=[ticker]}])

where N is a submission-time parameter to control the number of replicas, and ticker is the partitioning key (see last column of Table 1). In embodiments of the invention, this annotation was applied to all of the benchmarks and the throughput scalability for N=1, 2, 4, 8, 16, and 32 was measured. At N=1, the overhead of the parallel runtime can be quantified. It reduces the throughput by 34% on average. However, this overhead is skewed, because all but one of the benchmarks are relatively lightweight in terms of the workload encompassed by the spreadsheet operator. The light workload means sequential bottlenecks in the parallel runtime will dominate, per Amdahl's law. With the exception of mandelbrot there is at most a 2× gain in throughput for the benchmarks (using the unordered merge discussed below).

Figure 8:
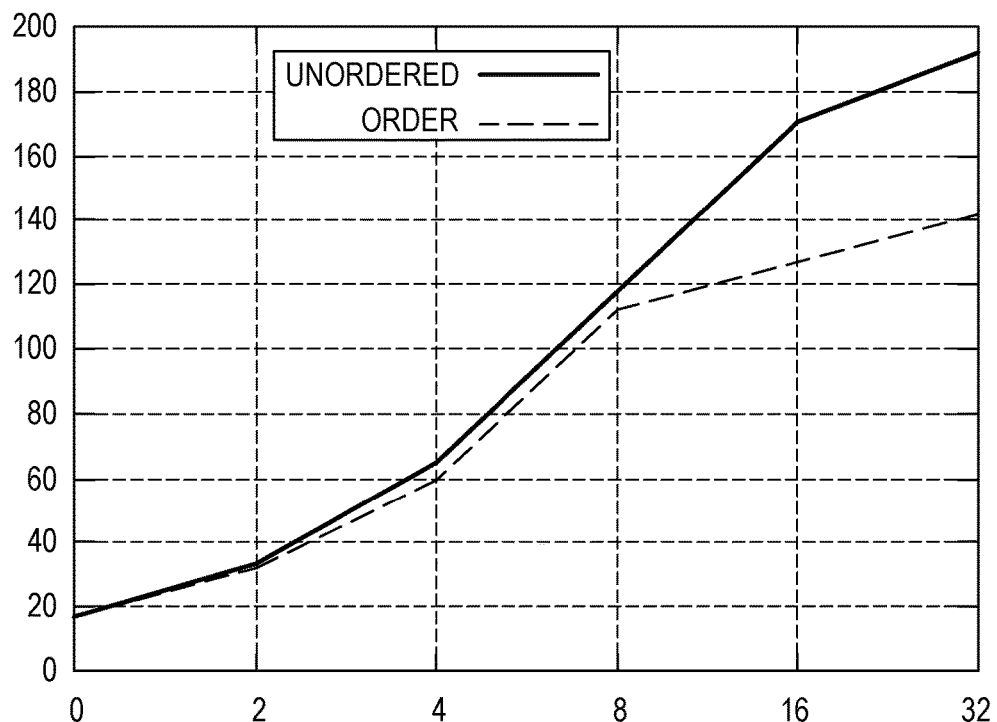
FIG. 8 shows the sequential execution time of a computation in a benchmark that may be used in embodiments of this invention.

The core computation in the mandelbrot benchmark is significantly more expensive. The parallel runtime overhead in this case is negligible and under 1%. The throughput increases with the number of channels, achieving a speedup of 8.2× with 32 cores compared to the sequential execution time as shown in FIG. 8.

The parallelization of the spreadsheet operator as described above requires the use of an ordered merge to serialize the outputs according to their timestamps. This however is an overkill for certain applications that naturally tolerate non-determinism in the order of the outputs, such as mandelbrot, where the pixel order is irrelevant. As another example, in pong, order only needs to be maintained within each game, but not across games. FIG. 8 compares the throughput for ordered and unordered merge for mandelbrot. With 32 cores, unordered merge achieves an addition 1.35× speedup over ordered merge (11.4× over sequential).

Incremental Window Updates

The two test cases with large unbounded windows are vwap and linearroad. For these, the impact of incremental window updates was measured and it is quite significant as might be expected. The average occupancy of a window for vwap is 7,800 trades and the incremental update is 58× faster than the alternative which recomputes the window on every tuple injection or eviction. For the test cases with bounded windows (forecast and average), incremental updates were not supported because these windows are implemented using PRE and the compiler does not analyze a sequence of PREs to determine that they encompass a bounded window.

It is possible in SPL to implement an incrementally updating computation over windows. In embodiments of the invention, a native SPL version of vwap was implemented. The benefits of incrementalization in this version of the benchmark is 31× over the baseline SPL implementation which does not use incremental updates. It is worthy to note that this required implementing a custom eviction operator.

The experiments demonstrate that the spreadsheet compiler yields fast code. The compiler can process hundreds of thousands of tuples per second, and is competitive with hand-written SPL code. In fact, for most benchmarks, it is so fast that it is not the bottleneck of the application, and thus, does not benefit from further parallelization. On the other hand, for the most expensive benchmark, parallelization can provide an order of magnitude better performance. The biggest performance benefit comes from incrementalizing sliding-window aggregations.

Embodiments of the invention provide a programming platform for stream processing based on spreadsheets. These features manipulate large or unknown data sets, and were not previously expressible due to the finite nature of the spreadsheet interface. The new constructs are implemented via a spreadsheet compiler to C++, deploying the resulting code in SPL. The new programming model has much improved expressivity, while still being easy to use for the non-programmer, and has an implementation whose performance matches modern stream processing languages.

Figure 9:
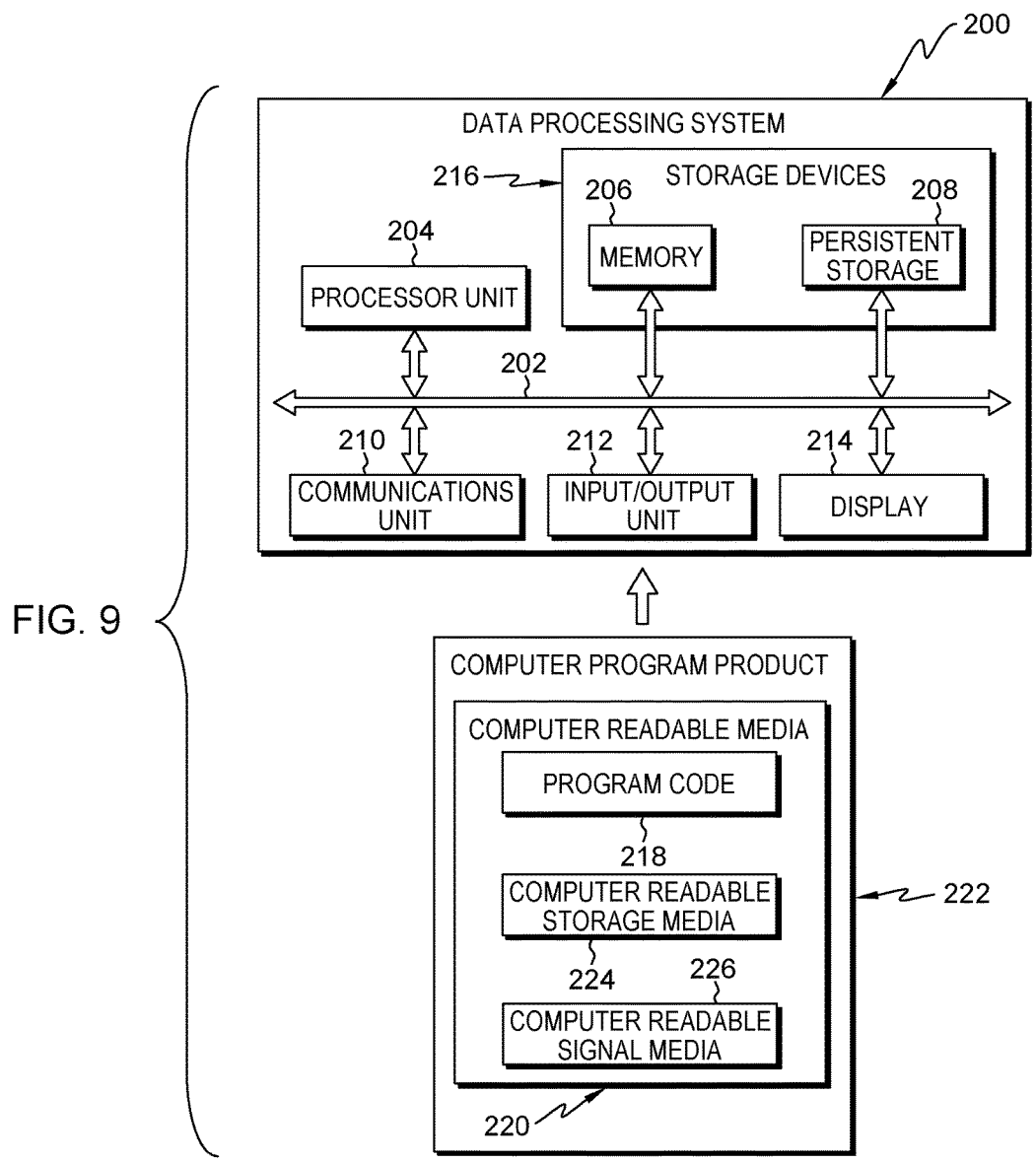
FIG. 9 shows a block diagram of a data processing system that may be used in embodiments of this invention.

FIG. 9 depicts a diagram of a data processing system in accordance with an illustrative embodiment. Data processing system 200 is an example of a computer, such as server or client, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code.

As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

What is claimed is:

1. A computer-implemented method of encoding a function in a spreadsheet program to execute stream processing on a computing system, the method comprising:
    encoding, by one or more processor units of an encoding computer system, one or more formulas in one or more cells of the spreadsheet program, the one or more formulas supporting data windows and stream partitioning in a data stream input to the spreadsheet program;
    designating, by the one or more processor units of the encoding computer system, a first group of cells of the spreadsheet program as input cells for holding input values for said one or more formulas; and
    designating, by the one or more processor units of the encoding computer system, a second group of cells of the spreadsheet program as output cells for holding output values of said one or more formulas; and wherein:
    one or more of the data windows in the data stream input to the spreadsheet program includes a plurality of stream values; and
    the one or more formulas supporting data windows and stream partitioning includes
        supporting data windows by encoding one of the cells of the spreadsheet with one formula of said one or more formulas to operate on all the stream values of each of said one or more of the data windows directly from said each data window in the data stream input to the spreadsheet program into an aggregate value for the one of the cells to decouple the data windows in the data stream input to the spreadsheet program from the spreadsheet, including
            providing a common class for implementing a windowing mechanism for inserting new ones of the stream values and evicting old ones of the stream values, and
            providing a specialized class for implementing a logic for said one formula,
        and
        supporting stream partitioning by encoding the spreadsheet program to partition the input data stream into a plurality of data stream partitions, and wherein the one or more formulas encoded in the spreadsheet program operate on each of the data stream partitions; and wherein:
    each of the stream values in the data stream has an associated timestamp; and
    the designating a first group of cells of the spreadsheet program as input cells for holding input values for said one or more formulas includes designating one of the first group of cells to hold one of the input values to represent the stream values in the input stream having timestamps within a specified period of time; and
    the supporting data windows further includes providing code for
        connecting an operator to the input data stream,
        naming a file containing the spreadsheet program,
        assigning attributes of input triples of the input data stream to cells of the first group of cells of the spreadsheet program,
        identifying ones of the attributes serving as partitioning keys, and
        identifying ones of the attributes serving as the timestamps.

2. The method according to claim 1, wherein the encoding one or more formulas in the spreadsheet program includes encoding the one or more formulas to operate on the input values in the input cells.

3. The method according to claim 1, wherein:
    the one or more formulas operate on the input values to generate the output values; and
    the encoding the one or more formulas includes encoding the one or more formulas to store the output values generated by the one or more formulas in the output cells.

4. The method according to claim 1, wherein:
    the stream partitioning includes partitioning a defined stream of data into a plurality of data stream partitions; and
    the encoding the one or more formulas includes encoding the one or more formulas in the spreadsheet program to operate on the plurality of data stream partitions in series.

5. The method according to claim 4, wherein the encoding the one or more formulas includes encoding the one or more formulas in the spreadsheet program to operate on the plurality of data streams in parallel.

6. The method according to claim 4, wherein:
    the one or more formulas includes a first formula and a second formula;
    the plurality of data stream partitions include a first data stream partition and a second data stream partition; and
    the encoding one or more formulas includes encoding the first formula in the spreadsheet program to process the first data stream partition, and encoding the second formula in the spreadsheet program to process the second data stream partition.

7. The method according to claim 1, wherein the windows are time based windows and collect values in the data stream from specified time intervals moving over time.

8. The method according to claim 1, wherein the windows are count based windows and collect a specified number of values in a defined data stream.

9. The method according to claim 1, wherein
the windows have variable sizes;
the stream processing includes processing a defined stream of data values;
each of the data values has an associated time value; and
the data values are processed by the one or more formulas in an order specified by the associated time values.

10. The method according to claim 1, wherein the supporting data windows by encoding one or more of the cells of the spreadsheet includes for each of the data windows that includes a plurality of the stream values in the data stream input to the spreadsheet program, encoding the one of the cells of the spreadsheet with one formula of said one or more formulas to operate on all of the stream values collected from said each data window to obtain the aggregate value.

11. The method according to claim 1, wherein the one of the cells is encoded to aggregate all the values of said each data window in the data stream input to the spreadsheet program directly from said each data window into the aggregate value whereby the stream values of each of variable-sized data windows in the data stream input to the spreadsheet program occupy only one cell of the spreadsheet.

12. A system for encoding a function in a spreadsheet program to support stream processing, the system comprising:
at least one computer system including at least one processor unit and a memory connected to the at least one processor unit; said at least one processor unit including:
at least one encoding module for encoding one or more formulas in one or more cells of the spreadsheet program, the one or more formulas supporting data windows and stream partitioning in a data stream input to the spreadsheet program; and
at least one spreadsheet module for designating a first group of cells of the spreadsheet program as input cells for holding input values for said one or more formulas, and for designating a second group of cells of the spreadsheet program as output cells for holding output values of said one or more formulas; and wherein:
one or more of the data windows in the data stream input to the spreadsheet program includes a plurality of stream values;
the one or more formulas supporting data windows and stream partitioning includes
supporting data windows by encoding one of the cells of the spreadsheet with one formula of said one or more formulas to operate on all the values of each of said one or more of the data windows directly from the each data window in the data stream input to the spreadsheet program into an aggregate value for the one of the cells to decouple the data windows in the data stream input to the spreadsheet program from the spreadsheet, and
supporting stream partitioning by encoding the spreadsheet program to partition the input data stream into a plurality of data stream partitions, and wherein the one or more formulas encoded in the spreadsheet program operate on each of the data stream partitions; and the at least one spreadsheet module includes
a common class for implementing a windowing mechanism for inserting new ones of the stream values and evicting old ones of the stream values, and
a specialized class for implementing a logic for said one formula; and wherein:
each of the stream values in the data stream has an associated timestamp; and
the designating a first group of cells of the spreadsheet program as input cells for holding input values for said one or more formulas includes designating one of the first group of cells to hold one of the input values to represent the stream values in the input stream having timestamps within a specified period of time; and
the supporting data windows further includes providing code for
connecting an operator to the input data stream,
naming a file containing the spreadsheet program,
assigning attributes of input triples of the input data stream to cells of the first group of cells of the spreadsheet program,
identifying ones of the attributes serving as partitioning keys, and
identifying ones of the attributes serving as the timestamps.

13. The system for encoding a function in a spreadsheet program according to claim 12, wherein the at least one encoding module encodes the one or more formulas to operate on the input values in the input cells.

14. The system for encoding a function in a spreadsheet program according to claim 12, wherein the at least one encoding module encodes the one or more formulas to operate on the input values to generate the output values, and encodes the one or more formulas to store the output values generated by the one or more formulas in the output cells.

15. The system for encoding a function in a spreadsheet program according to claim 12, wherein the stream partitioning includes partitioning a defined stream of data into a plurality of data stream partitions.

16. The system for encoding a function in a spreadsheet program according to claim 12, wherein the windows are time based windows and collect values in a given data stream from specified time intervals moving over time.

17. A computer program product comprising:
a computer readable medium having computer program code tangibly embodied therein for encoding a function in a spreadsheet program to support stream processing, the computer program code, when executed in a computer system, performing the following:
encoding one or more formulas in one or more cells of the spreadsheet program, each of the formulas supporting data windows and stream partitioning in a data stream input to the spreadsheet program;
designating a first group of cells of the spreadsheet program as input cells for holding input values for said one or more formulas; and
designating a second group of cells of the spreadsheet program as output cells for holding output values of said one or more formulas; and wherein:
one or more of the data windows in the data stream input to the spreadsheet program includes a plurality of stream values; and
the one or more formulas supporting data windows and stream partitioning includes
supporting data windows by encoding one of the cells of the spreadsheet with one formula of said one or more formulas to operate on all the stream values of each of said one or more of the data windows directly from the each data window in the data stream input to the spreadsheet program into an aggregate value for the one of the cells to decouple the data windows in the data stream input to the spreadsheet program from the spreadsheet, including providing a common class for implementing a windowing mechanism for inserting new ones of the stream values and evicting old ones of the stream values, and providing a specialized class for implementing a logic for said one formula, and supporting stream partitioning by encoding the spreadsheet program to partition the input data stream into a plurality of data stream partitions, and wherein the one or more formulas encoded in the spreadsheet program operate on each of the data stream partitions; and wherein:

each of the stream values in the data stream has an associated timestamp; and the designating a first group of cells of the spreadsheet program as input cells for holding input values for said one or more formulas includes designating one of the first group of cells to hold one of the input values to represent the stream values in the input stream having timestamps within a specified period of time; and the supporting data windows further includes providing code for connecting an operator to the input data stream, naming a file containing the spreadsheet program, assigning attributes of input triples of the input data stream to cells of the first group of cells of the spreadsheet program, identifying ones of the attributes serving as partitioning keys, and identifying ones of the attributes serving as the timestamps.

18. The computer program product according to claim 17, wherein the stream partitioning includes partitioning a defined stream of data into a plurality of data stream partitions.

19. The computer program product according to claim 17, wherein the windows are count based windows and collect a specified number of values in the data stream.

* * * * *